US012633286B2

(12) United States Patent
Rank et al.

(10) Patent No.: US 12,633,286 B2
(45) Date of Patent: May 19, 2026

(54) MACHINE LEARNING MODEL IMPROVEMENT

(71) Applicant: CX360, Inc., Omaha, NE (US)

(72) Inventors: Schuyler K. Rank, Omaha, NE (US);
Laura J. Kleiman, Omaha, NE (US);
Patrick M. Peterson, Omaha, NE (US)

(73) Assignee: CX360, Inc., Omaha, NE (US)

( * ) Notice: Subject to any disclaimer, the term of this patent is extended or adjusted under 35 U.S.C. 154(b) by 153 days.

(21) Appl. No.: 18/401,171

(22) Filed: Dec. 29, 2023

(65) Prior Publication Data

US 2025/0218430 A1      Jul. 3, 2025

(51) Int. Cl.
*G10L 15/18* (2013.01)
*G10L 15/01* (2013.01)
*G10L 15/06* (2013.01)
*G10L 15/183* (2013.01)
*G10L 15/22* (2006.01)

(52) U.S. Cl.
CPC .......... *G10L 15/1815* (2013.01); *G10L 15/01* (2013.01); *G10L 15/063* (2013.01); *G10L 15/183* (2013.01); *G10L 15/22* (2013.01)

(58) Field of Classification Search
CPC ... G10L 15/1815; G10L 15/01; G10L 15/063; G10L 15/183; G10L 15/22
See application file for complete search history.

(56) References Cited

U.S. PATENT DOCUMENTS

| | | | |
|---|---|---|---|
| 12,039,612 B1* | 7/2024 | Zumpano | G06Q 40/08 |
| 2016/0196820 A1* | 7/2016 | Williams | G10L 15/1822 |
| | | | 704/244 |
| 2019/0013038 A1* | 1/2019 | Thomson | G06F 40/20 |
| 2020/0349919 A1* | 11/2020 | Wanas | G10L 15/22 |
| 2023/0315722 A1* | 10/2023 | Saxe | G06F 16/3322 |
| | | | 726/1 |
| 2024/0241820 A1* | 7/2024 | Pentyala | G06F 11/3688 |
| 2025/0111147 A1* | 4/2025 | Pryzant | G06F 40/56 |
| 2025/0166236 A1* | 5/2025 | Azarian Yazdi | G06T 11/00 |
| 2025/0209156 A1* | 6/2025 | Sankaran | G06N 3/045 |

* cited by examiner

*Primary Examiner* — Michael Colucci
(74) *Attorney, Agent, or Firm* — Patent Capital Group

(57)      ABSTRACT

There is disclosed, in an example, a computer-implemented system and method, which includes providing a large set of validation prompts; testing a first ML intent model with the large set of validation prompts, wherein the first ML intent model is to select for respective validation prompts a first intent from an intent set; testing a second ML intent model with the large set of validation prompts, wherein the second ML intent model is to select for the same validation prompts a second intent from the intent set; selecting a reduced set of validation prompts, comprising validation prompts for which the first intent and second intent do not match; receiving an analysis of the reduced set of validation prompts, including indicia of hits, wherein one of the ML intent models inferred a correct intent; and selecting as a preferred model an ML model of the first ML intent model or second ML model that provided more hits.

19 Claims, 12 Drawing Sheets

MACHINE LEARNING MODEL IMPROVEMENT

FIELD OF THE SPECIFICATION

This application relates in general to machine learning (ML), and more particularly though not exclusively to a system and method for selective ML model improvement by comparison.

BACKGROUND

Machine learning models are often improved by an iterative process of training and re-training on various data sets.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
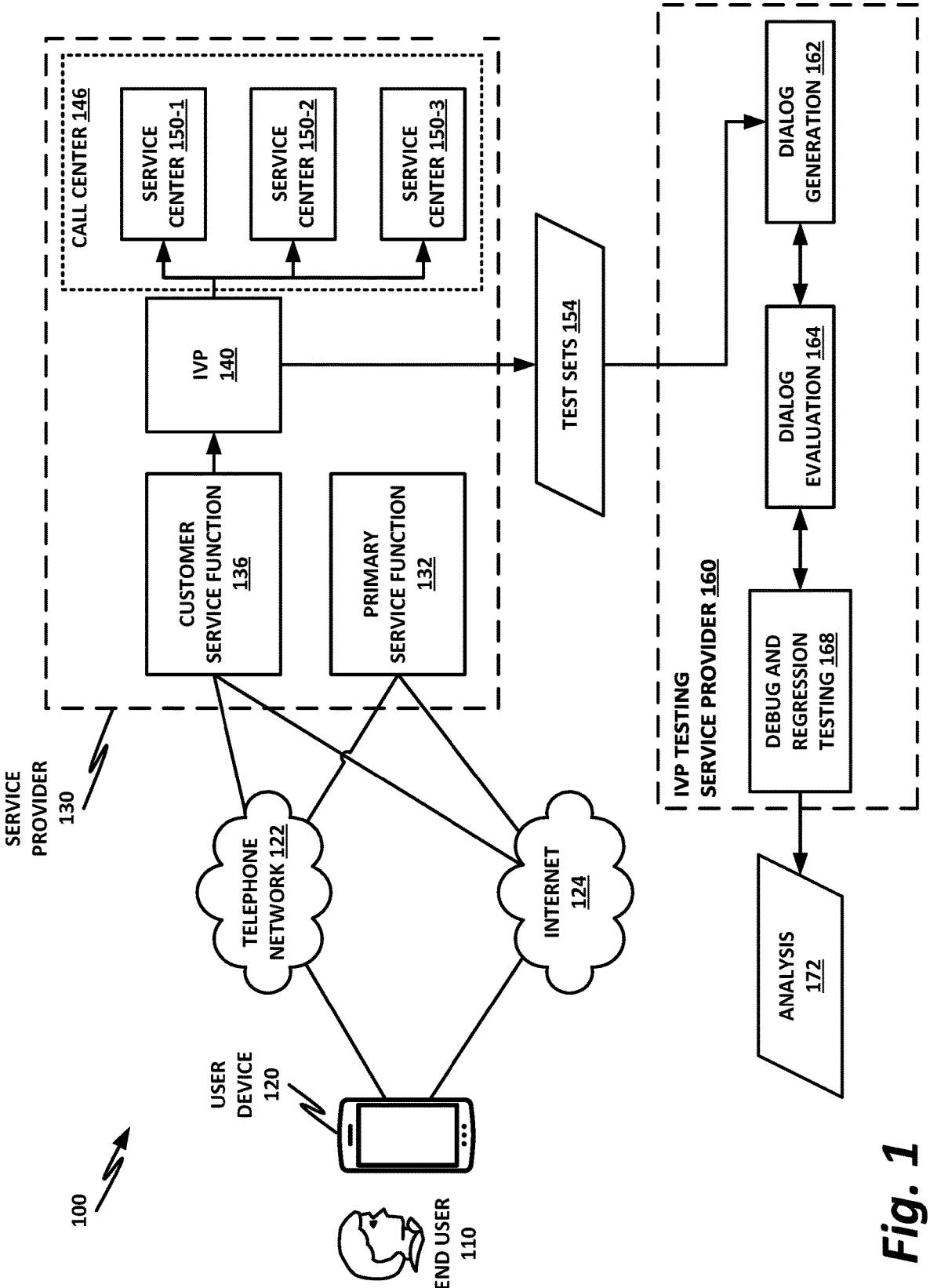
FIG. 1 is a block diagram of selected elements of an interactive voice platform (IVP) ecosystem.

There is disclosed, in an example, a computer-implemented system and method, which includes providing a large set of validation prompts; testing a first ML intent model with the large set of validation prompts, wherein the first ML intent model is to select for respective validation prompts a first intent from an intent set; testing a second ML intent model with the large set of validation prompts, wherein the second ML intent model is to select for the same validation prompts a second intent from the intent set; selecting a reduced set of validation prompts, comprising validation prompts for which the first intent and second intent do not match; receiving an analysis of the reduced set of validation prompts, including indicia of hits, wherein one of the ML intent models inferred a correct intent; and selecting as a preferred model an ML model of the first ML intent model or second ML model that provided more hits.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Overview

Interactive voice assistants (IVA) and interactive voice response (IVR) systems may provide a natural language processing (NLP) interface for users, clients, employees, or others to access functions of a service system such as a customer service center. Within this specification, IVAs and IVRs are used as nonlimiting examples of an interactive voice platform (IVP), which broadly represents the class of service functions with NLP interfaces.

A high-level goal of an IVP may be to analyze the human user's natural voice inputs and to use a sentiment analysis engine to infer the user's intent. The natural voice inputs may be, for example, in the form of spoken word or text depending on the type of interface. The intent may match to a backend service function of the system that is intended to satisfy the user's intent. For example, if the user's intent is to report a lost, stolen, or damaged credit card, then a purpose of the IVP may be to infer that user's intent, and to connect the user with a service center that handles loss, damage, and stolen credit cards. This service center may be staffed by human customer service agents (CSA), or it may be a fully or partially automated system that can handle the customer service function itself. An advantage of an IVP that operates correctly is that it will quickly connect the user to the appropriate service center with a minimum number of queries to the user, and thus will minimize cost to the service provider and frustration for the user. Even in cases where the service center is manned by human operators, there still may be great benefit in connecting the user to the correct service center in the first instance, with the correct contextual data, and with as much pre-filled data as possible to aid the human CSA.

In an even more beneficial use case, the IVP is able to handle the user's question fully autonomously without involving a human CSA. If the IVP can do this without frustrating the user, then the result may be a satisfied user who had his or her customer service function successfully fulfilled, with reduced labor costs for the service provider.

Depending on the complexity of the IVP, the number of intents (e.g., destinations for natural language prompts) may range from just a few intents to hundreds of intents. Common practice in the industry dictates that to properly train the IVP, each intent should be trained with on the order of 50 to 100 examples of that intent. In training the IVP, more variability in the prompts—as long as the prompts make sense—can result in better training of the system. Furthermore, training the system with more prompts per intent may also result in better refinement of the model (e.g., better matching of real intents to the best customer service function, or even adding new intents and functions), with the results of a greater likelihood to direct the customer to the best available customer service function with minimal prompting from the IVP.

One difficulty with such a system is that the more intents there are available on the system, the more nuance may be required in analyzing the NLP prompts from the human user. For example, for a menu with only four choices or intents, on the order of 20 to 50 examples may be sufficient to adequately train the model to respond to most human users. This may require on the order of 80 to 200 training phrases to train the model. However, the more intents there are, the more likely there is to be nuance and overlap. Thus, for example, with a model that has 50 intents or destinations, it may be desirable to provide more training phases, on the order of 50 to 100 exemplar training phases per intent. Thus, for this example system, 2,500 to 5,000 training phases may be desired to adequately train the model.

In at least some current systems, human speech experts review transcripts from past customer service calls to refine the IVP model. Human experts may copy and paste snippets of conversation from the transcripts and use them as training prompts, and may also try to image and craft variations of those prompts. These training prompts are used to train a next incremental versions of the ML model that drives the IVP. Limitations of this process include human fatigue and human creativity. While human experts can copy and paste dialogue, it is also beneficial to anticipate other ways in which different human callers may phrase similar queries. However, having seen the transcripts, human users tend to get caught in a "rut" of providing very similar prompts. Thus the ML model may suffer if a different human user calls and interacts with the IVP using different language. It is very difficult for a human user alone to anticipate a large number of potential prompts, and especially prompts that would substantially vary from her own preferred method of speaking.

Alternatively, or additionally, the human expert may not rely on her own creativity alone, but instead may use a generative artificial intelligence (GAI) to quickly generate a large noble number of example responses to the dialogue prompt for each intent. In field testing of this concept, the GAI did not initially return prompts with as much variability as human responses from a wider selection of humans. However, by iteratively prompting the GAI to try different approaches, the speech expert elicited more variability to better simulate responses from a broad range of human callers or users.

In an illustrative example, the human user first prompted the GAI as follows: I'm gathering data to train an ML classifier for Apple products in a call center. Give me 20 ways a person might respond in a call about an iPhone.

Initially, the GAI returned prompts including the following:

My iphone is not turning on.
My iphone is not charging.
My iphone is not connecting to Wi-Fi.
My I fight iPhone is not connecting to cellular data.
My iPhone's screen is cracked.

My iPhone's battery is draining quickly.
My iphone is running slow.
My iphone has been lost or stolen.
I need to reset my iphone.
I need to update my iphone's software.
I need to transfer data from my old iPhone to my new iPhone.
I need to find a repair center for my iphone.
I need to buy a new iPhone.
I have a question about my iphone's warranty.
I have a complaint about my iphone.

The human operator then prompted the GAI: Add some variety to your language. Almost all of your examples are about "my iphone" and many have "I need." In real life, people refer to the product as other things like "my Apple phone" or "myself on." And they call for other people, like children or parents. Give me 20 more examples.

Prompted thus, the GAI provided more examples. These included:

My Apple phone won't turn on.
My cell phone screen is cracked.
My son's iPhone is not connecting to Wi-Fi.
I need to reset my friend's phone.
I need to update my coworker's phone's software.
I have a complaint about my phone.
I'm calling for my son/daughter/husband/wife/mother/father/grandmother/grandfather.

With the initial prompt, the human expert elicited iPhone intents. While the GAI provided a large number of prompts, the variability was lacking. Every sample was for "my iphone," never "my cell phone" or "my daughter's iPhone 8." Furthermore, every sample included both a product and an issue, never just a product and never just an issue. By nudging the GAI with additional prompts and working iteratively with the GAI, the human expert was able to fill some of these gaps. Specifically, the second prompt tried to elicit a wider range of the of intents.

Yet the response still was not perfect. Some of these responses were unlikely to occur in natural human speech, or were otherwise unusable. Furthermore, the use of "I need" was not sufficiently reduced.

With improved prompting, a human speech scientist may generate a wide range of responses by working cooperatively and iteratively with the GAI. In the above test, human speech scientists were able to generate a wide range of responses that broaden the product name and owner by continuing to prompt the GAI. It is also possible to define a set of GAI prompts that, when combined would generate humanlike variability.

After generating a large number of training prompts, the speech scientists were able to review the training prompts and to remove any that were implausible, impossible, or otherwise faulty, such as those that would not be useful to the ML model, that were highly unlikely to occur in actual human speech, or that simply did not make sense.

Thus, with human feedback, the GAI model is capable of producing a large set of training prompts for training the ML model, while reducing the time required for human experts to spend writing the prompts.

The method disclosed here may also include generating training phrases for entities for the IVP. Entities are places in the dialogue where the system expects specific identifying responses. For example, dates, times, dollar amounts, telephone numbers, credit card numbers, and other similar entities are common and are typically available off-the-shelf from an IVP vendor. The IVP service provider, which purchases the IVP product from an IVP vendor, may also provide enterprise-specific entities. These may include product names, locations, destinations, enumerated choices, or other entities that speech experts may develop and maintain. For example, an airline may include in its enterprise-specific entities a list of cities and airport codes that are on the provider's routes. In this example, if the IVP prompts "what airport?", The answers Los Angeles, Los Angeles international, Los Angeles international Airport, LA airport, and LAX may all be considered equivalent answers.

Entities and intents may have different needs for training data. As with the intent training, a GAI may be able to provide probable variations of a single entity. For example, a GAI may be able to provide a probable list of variations of a single airport name in one query. Given a list of equivalents for a single entity, it is possible for a human expert to manually construct a set of training queries that all use the same language, with substitutions for each of the equivalent entities. However, this is a repetitive and error-prone task for a human user. On the other hand, this is the kind of repetitive task that computers are very good at. Given a list of prompts, and a list of entity equivalents, it is very straightforward for the human user to ask the GAI to generate variations of each prompt using each available entity equivalent. Thus, the variability in both intents and entities may be accommodated in a single tool.

The present specification provides an assessment method with a training data tool for speech experts to select the best training phrases from transcriptions and/or AI generated prompts. This can eliminate the large, error-prone task of repetitive copy-pastes, while reducing cost and incorporating best practices. This also provides essential human review and prompting of GAIs. Using this method, the IVP modeler may obtain hundreds to thousands of user prompts to train IVP intent classifiers.

Once a large number of prompts have been generated in this manner, it may also be necessary to validate that the retraining provides improvements in the model. Thus, in one illustrative example, a copy may be made of the current version of the model and saved as a next version or "new" version of the ML model. The new model may then be trained on the generated training prompts, which may be annotated with the correct intent that each prompt correlates to. With this training, the IVP now has two competing versions of the model to test against.

In an illustrative testing regimen, raw user data may include recorded user interactions from actual customer service calls or queries, which have not been classified or annotated. These recorded interactions may be run as test scripts against both versions of the model. Based on these interactions, each version of the model will create an inferred intent based on its sentiment analysis of the interaction.

To validate the utility of the model, a human user or operator may review the inferred intents from each version of the model and determine whether the model inferred the correct intent. Because the set of validation prompts may include hundreds or thousands of prompts, it may be both time consuming and unnecessary for a human operator to review every interaction. Because the "current model" has presumably already passed validation, and is already trusted to a degree, it may be unnecessary to review every interaction. Rather, the relevant question is whether the new version of the model performs better than the old version of the model. To answer this question, the human analysts may selectively review only prompts for which the two models provided different inferred intents. In cases where both models are correct or both models are wrong, the result may not be interesting from the perspective of determining which model is better. Thus the human analyst receives only a subset of responses to review, which may be on the order of only 10 to 20% of the full response set.

In reviewing the inferred intents, there are effectively two possibilities. First, both models may be wrong in different ways, in which case the results can simply be discarded, because neither model performed correctly on that query. Second, one model may be correct, while the other may be wrong. In that case, one model outperformed the other model, and thus receives credit in the form of a "hit."

After analyzing the prompts for which the models returned different responses, the human analyst may enumerate the number of good hits for each model. Again, these hits represent an instance where the selected model provided the correct answer, while the other model provided the wrong answer. Thus, the model that has more hits may be selected as the new working model—whether that be the original model, or the new/modified model.

Once a model has been selected as the current working version of the model, the process of generating new prompts and retraining the model may iteratively continue.

Selected Examples

The foregoing can be used to build or embody several example implementations, according to the teachings of the present specification. Some example implementations are included here as nonlimiting illustrations of these teachings.

There is disclosed in one example a computer-implemented method, comprising: providing a large set of validation prompts; testing a first ML intent model with the large set of validation prompts, wherein the first ML intent model is to select for respective validation prompts a first intent from an intent set; testing a second ML intent model with the large set of validation prompts, wherein the second ML intent model is to select for the same validation prompts a second intent from the intent set; selecting a reduced set of validation prompts, comprising validation prompts for which the first intent and second intent do not match; receiving an analysis of the reduced set of validation prompts, including indicia of hits, wherein one of the ML intent models inferred a correct intent; and selecting as a preferred model an ML model of the first ML intent model or second ML model that provided more hits.

There is further disclosed an example, wherein the analysis of the reduced set of validation prompts is a human analysis.

There is further disclosed an example, wherein the second ML model is an updated version of the first ML intent model trained on a large set of training prompts.

There is further disclosed an example, wherein the second ML model receives supervised training on the large set of training prompts.

There is further disclosed an example, wherein the second ML model receives unsupervised training on the large set of training prompts.

There is further disclosed an example, further comprising generating the large set of training prompts with aid of a large language model (LLM).

There is further disclosed an example, further comprising a human analyst prompting the LLM to generate the large set of training prompts.

There is further disclosed an example, further comprising the human analyst rejecting undesirable training prompts.

There is further disclosed an example, further comprising the human analyst prompting the LLM to generate a set of varied identifiers for entities.

There is further disclosed an example, wherein the large set of training prompts comprise more than 50 training prompts per intent in the intent set.

There is further disclosed an example, wherein the intent set comprises more than 50 intents.

There is further disclosed an example, wherein the first ML intent model and second ML model are natural language processing (NLP) models.

There is further disclosed an example, wherein the first ML intent model and second ML model are to provide an interactive voice response (IVR) system.

There is further disclosed an example, wherein the first ML intent model and second ML model are to provide an interactive voice assistant (IVA).

There is further disclosed an example, wherein the first ML intent model and second ML model are to provide a customer service function.

There is further disclosed an example, wherein the first ML intent model and second ML intent model provide a speech-to-text interface.

There is further disclosed an example, wherein the first ML intent model and second ML intent model provide a text-based chatbot interface.

There is further disclosed an example of an apparatus comprising means for performing the method.

There is further disclosed an example, wherein the means for performing the method comprise a processor and a memory.

There is further disclosed an example, wherein the memory comprises machine-readable instructions that, when executed, cause the apparatus to perform the method.

There is further disclosed an example, wherein the apparatus is a computing system.

There is further disclosed an example of at least one computer readable medium comprising instructions that, when executed, implement a method or realize an apparatus as described.

There is further disclosed an example of one or more tangible, nontransitory computer-readable storage media having stored thereon executable instructions to: provide a large set of validation prompts; test a first ML intent model with the large set of validation prompts, wherein the first ML intent model is to select for respective validation prompts a first intent from an intent set; test a second ML intent model with the large set of validation prompts, wherein the second ML intent model is to select for the same validation prompts a second intent from the intent set; select a reduced set of validation prompts, comprising validation prompts for which the first intent and second intent do not match; receive an analysis of the reduced set of validation prompts, including indicia of hits, wherein one of the ML intent models inferred a correct intent; and select as a preferred model an ML model of the first ML intent model or second ML model that provided more hits.

There is further disclosed an example, wherein the analysis of the reduced set of validation prompts is a human analysis.

There is further disclosed an example, wherein the second ML model is an updated version of the first ML intent model trained on a large set of training prompts.

There is further disclosed an example, wherein the second ML model receives supervised training on the large set of training prompts.

There is further disclosed an example, wherein the second ML model receives unsupervised training on the large set of training prompts.

There is further disclosed an example, wherein the instructions are further to generate the large set of training prompts with aid of a large language model (LLM).

There is further disclosed an example, wherein the instructions are further to receive, from a human analyst, prompts for the LLM to generate the large set of training prompts.

There is further disclosed an example, wherein the instructions are further to receive, from the human analyst, rejections of undesirable training prompts.

There is further disclosed an example, wherein the instructions are further to receive, from a human analyst, prompts for the LLM to generate a set of varied identifiers for entities.

There is further disclosed an example, wherein the large set of training prompts comprise more than 50 training prompts per intent in the intent set.

There is further disclosed an example, wherein the intent set comprises more than 50 intents.

There is further disclosed an example, wherein the first ML intent model and second ML model are natural language processing (NLP) models.

There is further disclosed an example, wherein the first ML intent model and second ML model are to provide an interactive voice response (IVR) system.

There is further disclosed an example, wherein the first ML intent model and second ML model are to provide an interactive voice assistant (IVA).

There is further disclosed an example, wherein the first ML intent model and second ML model are to provide a customer service function.

There is further disclosed an example, wherein the first ML intent model and second ML model provide a speech-to-text interface.

There is further disclosed an example, wherein the first ML intent model and second ML intent model provide a text-based chatbot interface.

There is further disclosed an example of a computing apparatus, comprising: a hardware platform comprising a processor circuit and a memory; and instructions encoded within the memory to instruct the processor circuit to: provide a large set of validation prompts; test a first ML model with the large set of validation prompts, wherein the first ML model is to select for respective validation prompts a first intent from an intent set; test a second ML model with the large set of validation prompts, wherein the second ML model is to select for the same validation prompts a second intent from the intent set; select a reduced set of validation prompts, comprising validation prompts for which the first intent and second intent do not match; receive an analysis of the reduced set of validation prompts, including indicia of hits, wherein one of the ML models inferred a correct intent; and select as a preferred model an ML model of the first ML model or second ML model that provided more hits.

There is further disclosed an example, wherein the analysis of the reduced set of validation prompts is a human analysis.

There is further disclosed an example, wherein the second ML model is an updated version of the first ML model trained on a large set of training prompts.

There is further disclosed an example, wherein the second ML model receives supervised training on the large set of training prompts.

There is further disclosed an example, wherein the second ML model receives unsupervised training on the large set of training prompts.

There is further disclosed an example, wherein the instructions are further to generate the large set of training prompts with aid of a large language model (LLM).

There is further disclosed an example, wherein the instructions are further to receive, from a human analyst, prompts for the LLM to generate the large set of training prompts.

There is further disclosed an example, further comprising receiving, from the human analyst, rejections of undesirable training prompts.

There is further disclosed an example, wherein the instructions are further to receive, from a human analyst, prompts for the LLM to generate a set of varied identifiers for entities.

There is further disclosed an example, wherein the large set of training prompts comprise more than 50 training prompts per intent in the intent set.

There is further disclosed an example, wherein the intent set comprises more than 50 intents.

There is further disclosed an example, wherein the first ML model and second ML model are natural language processing (NLP) models.

There is further disclosed an example 0, wherein the first ML model and second ML model are to provide an interactive voice response (IVR) system.

There is further disclosed an example, wherein the first ML model and second ML model are to provide an interactive voice assistant (IVA).

There is further disclosed an example, wherein the first ML model and second ML model are to provide a customer service function.

There is further disclosed an example, wherein the first ML model and second ML model provide a speech-to-text interface.

There is further disclosed an example, wherein the first ML model and second ML model provide a text-based chatbot interface.

DETAILED DESCRIPTION OF THE DRAWINGS

A system and method for machine learning model improvement will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of selected elements of an IVP ecosystem 100. IVP ecosystem 100, in this illustration, includes three major players, namely an end user 110, a service provider 130, and an IVP testing service provider. Service provider 130 provides a primary service function 132 to end user 110. For example, service provider 130 may be a phone company, a bank, a cellular provider, an e-commerce provider, or other service provider that may benefit from an IVR.

Primary service function 132 includes the substantive service that service provider 130 provides to end users 110. For example, if service provider 130 is a mobile phone service, then its primary service function is providing mobile telephony to its customers.

In support of the primary service function 132, service provider 130 may also include a customer service function 136. Customer service function 136 may be an auxiliary to primary service function 132, and may handle customer questions, complaints, service requests, and other support functions. Customer service function 136 may operate an IVP 140. End user 110 may access customer service function 136 using a user device 120, such as a cell phone or landline phone, via telephone network 122, which may be a cellular network, a digital network, voiceover IP, public switched telephone network (PSTN), text interface, or other appropriate network.

In an illustrative service example, end user 110 operates user device 120 to call service provider 130 via telephone network 122. Service provider 130 connects user device 120 to customer service function 136. Customer service function 136 accesses IVP 140, which may include a user sentiment engine that attempts to connect user 110 to an appropriate service center 150, based on an inferred intent.

A call center 146 may include a plurality of service centers 150-1, 150-2, and 150-3, for example. One function of IVP 140 is to timely connect end user 110 to an appropriate service center 150 to handle the issue or concern presented by end user 110. Service centers 150 may include one or both of human customer service agents (CSA) and electronic resources.

In addition to a voice telephone network 122, end user 110 may use device 120 to access internet 124, which may connect end user 110 to both primary service function 132 and customer service function 136. Modern customer service centers often include a chatbot or other text-based version of the IVP.

In general terms, a successful customer service interaction may be defined as one in which user 110 is timely routed to the appropriate service center 150, and the service center 150 is able to resolve the customer's concern or issue to the customer's satisfaction. An unsuccessful customer service interaction is one in which the customer becomes frustrated, or angry, terminates the call prematurely, or one in which the concern is not resolved to the customer's satisfaction. Furthermore, even if customer service function 136 successfully resolves end user 110's concern, if the resolution is not timely, then the customer may nevertheless feel unsatisfied, which represents, at best, a partial success for customer service function 136.

Thus, it may be a goal of IVP 140 to timely infer an intent and connect end user 110 to an appropriate service center 150 in such a way that end user 110's issue or concern is satisfactorily resolved.

To provide more and better service interactions, service provider 130 may contract with IVP testing service provider 160 to improve IVP 140. For example, it is common to inform users of an IVP system that their calls may be recorded for training and quality assurance. When those calls are recorded, a large batch of call recordings may be sent as a test set 154 to IVP training service provider 160.

IVP training service provider 160 may be the same enterprise that originally sourced the IVP 140, or it may be a third-party entity. In this example, IVP training service provider 160 performs services such as dialog generation 162, dialog evaluation 164, and debug and regression testing 168, which ensures that an allegedly improved model still provides correct results on a known set of test data. Based on its analysis, IVP testing service provider 160 may provide analysis 172, which can be used to improve the IVP 140.

Figure 2:
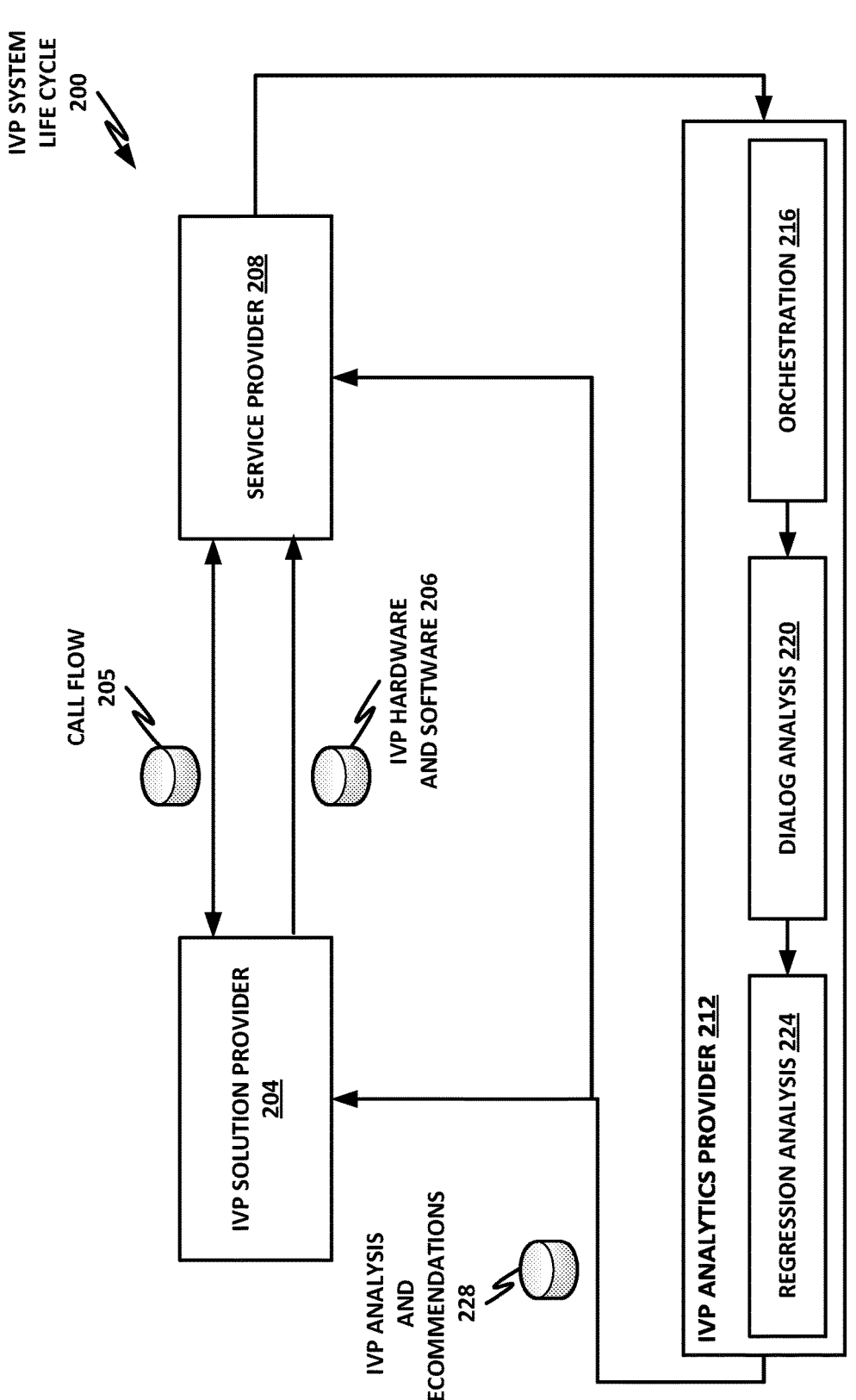
FIG. 2 is a block diagram of selected elements of an IVP life cycle.

FIG. 2 is a block diagram of selected elements of an IVP system lifecycle 200. IVP system lifecycle 200 illustrates interactions between an IVP solution provider 204, a service provider 208, and an IVP analytics provider 212, which may optionally be an embodiment of IVP testing service provider 160 of FIG. 1.

IVP solution provider 204 is the original vendor of hardware and software to provide a comprehensive IVP solution to service provider 208. IVP solution provider 204 provides the initial programming and setup of the IVP system hardware and software. IVP solution provider 204 may work closely with service provider 208 to identify call flows 205. Call flows 205 may include a set of intents, destinations, training requirements, a call tree, or other related data. Once IVP solution provider 204 has the appropriate call flows 205, it may program the IVP system and deliver IVP hardware and software 206 to service provider 208.

Service provider 208 purchases and operates the IVP system as part of its customer service function, and operates the IVP system for a time to provide services to its customers.

After some use of the IVP system, service provider 208 may wish to improve IVP hardware and/or software 206 for example, to ensure that end users have a better customer service experience with better matching of inferred intent to actual customer intent. To this end, service provider 208 may contract with an IVP analytics provider 212. IVP analytics provider 212 may be the same enterprise as IVP solution provider 208, a related enterprise, or a completely separate enterprise.

IVP analytics provider 212 provides analysis of the IVP system. This includes a pipeline that provides, for example, orchestration 216, dialog analysis 220, and regression analysis 224. Orchestration 216 may coordinate efforts of several entities, such as human users, an LLM, various sentiment models, and databases. Dialog analysis 220 may include services such as generating training prompts, training models on new dialog, analyzing results of test runs, and comparing versions of models. Regression analysis 224 may include testing a version of a model (e.g., an allegedly improved version) against a set of reference prompts or reference data with known, tagged values such as user intent. A purpose of regression testing may be to ensure that the new version of the model performs at least as well on the reference data as the old model it is to replace.

IVP analytics provider 212 may provide analysis and recommendations 228, which in appropriate circumstances may be provided to service provider 208 and/or to IVP solution provider 204 to improve the IVP system.

Figure 3:
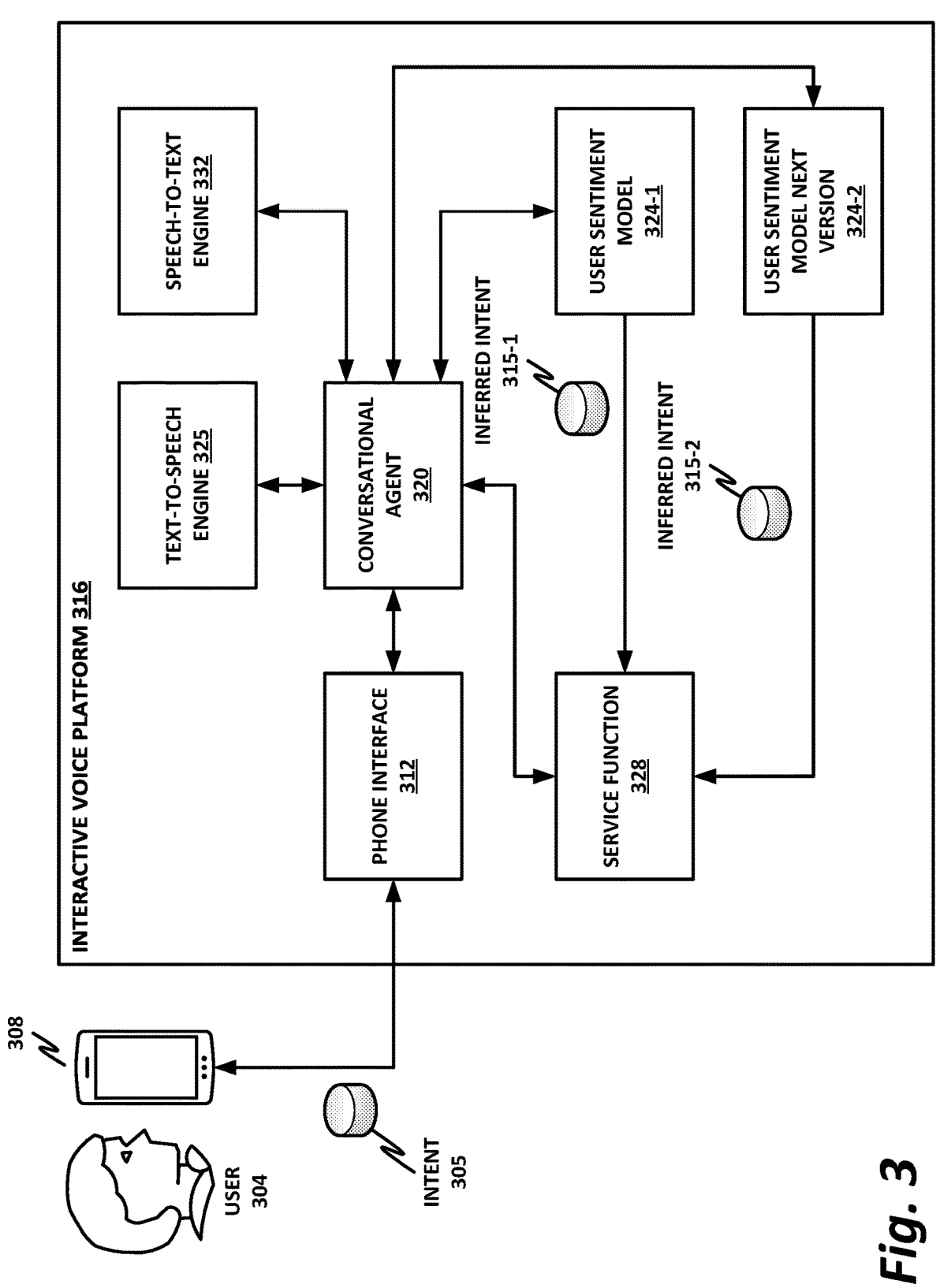
FIG. 3 is a block diagram of selected elements of a first embodiment of an IVP.

FIG. 3 is a block diagram of selected elements of an interactive voice platform (IVP) 316.

In this illustration, a user 304 operates a voice interface such as a cell phone 308 to communicate with IVP 316. User 304 has a subjective intent 305. Intent 305 represents a high-level goal that user 304 is trying to achieve, and ideally subjective intent 305 corresponds to an available service function that IVP 316 can connect user 304 to, whether it be an automated service function or a service function provided by a human CSA. For example, user 304 may be trying to order a product, cancel service, report a problem, file a complaint, provide a review, book a flight, request repairs, or any other intent that may be serviced by IVP 316.

A phone interface 312 provides an API for IVP 316 to interact with user 304 via telephone 308.

Conversational agent 320 uses phone interface 312 to communicate with user 304. Speech-to-text engine 332 may translate verbal prompts from user 304 into text that is usable by conversational agent 320, while text-to-speech engine 325 may provide verbal cues back to user 304.

Conversational agent 320 may include a trained ML model to determine how to respond to the customers queries. This may include a user sentiment model 324-1, which provides an inferred intent 315-1 to conversational agent 320. The mechanics of such ML models are well understood, and FIGS. 11 and 12 below illustrate some of the mechanics and principles of machine learning that may be applicable to the ML model.

Based on inferred intent 315-1, conversational agent 320 may place user 304 in contact with a service function 328, which will satisfy user 304's intent 305 if conversational agent 320 properly infers the user's intent.

As described above, a human speech expert or other may use a GAI or other methods to generate a large number of samples or predicted training prompts that can then be used to train user sentiment model next version 324-2. Next version 324-2 provides an inferred intent 315-2, which may be the same as inferred intent 315-1 or different.

In an illustrative use case, user sentiment model next version 324-2 does not substantively connect user 304 to service function 328. Rather, while next version 324-2 is in testing, it may log its inferred intents 315-2 for later analysis. Note that this could be a real-world deployment (operating in parallel to model 324-1), or as part of an offline testing regimen.

After user sentiment model next version 324-2 has logged a sufficient number of inferred intents 315-2, the system may compare the set of inferred intents 315-1 to inferred intents 315-2. For the set of conversations in which inferred intents 315-1 are the same as inferred intents 315-2, these results are not interesting for the purpose of comparing or determining which model is better. However, cases where inferred intent 315-1 is different from inferred intent 315-2 are interesting for comparison purposes. A human analyst may receive a subset of transcripts for interactions in which inferred intent 315-1 is different from inferred intent 315-2. In cases where user sentiment model 324-1 and user sentiment model next version 324-2 are both incorrect, the results may be discarded as uninteresting for comparison purposes. In cases where only one of the models is correct, said one model (user sentiment model 324-1 or user sentiment model next version 324-2) is credited with a good hit for that response. If user sentiment model next version 324-2 scores more hits than user sentiment model three 324-1, then at an appropriate upgrade point, user sentiment model 324-1 may be taken off-line or discarded, and user sentiment model next version 324-2 may replace it as the active model for servicing requests.

Figure 4:
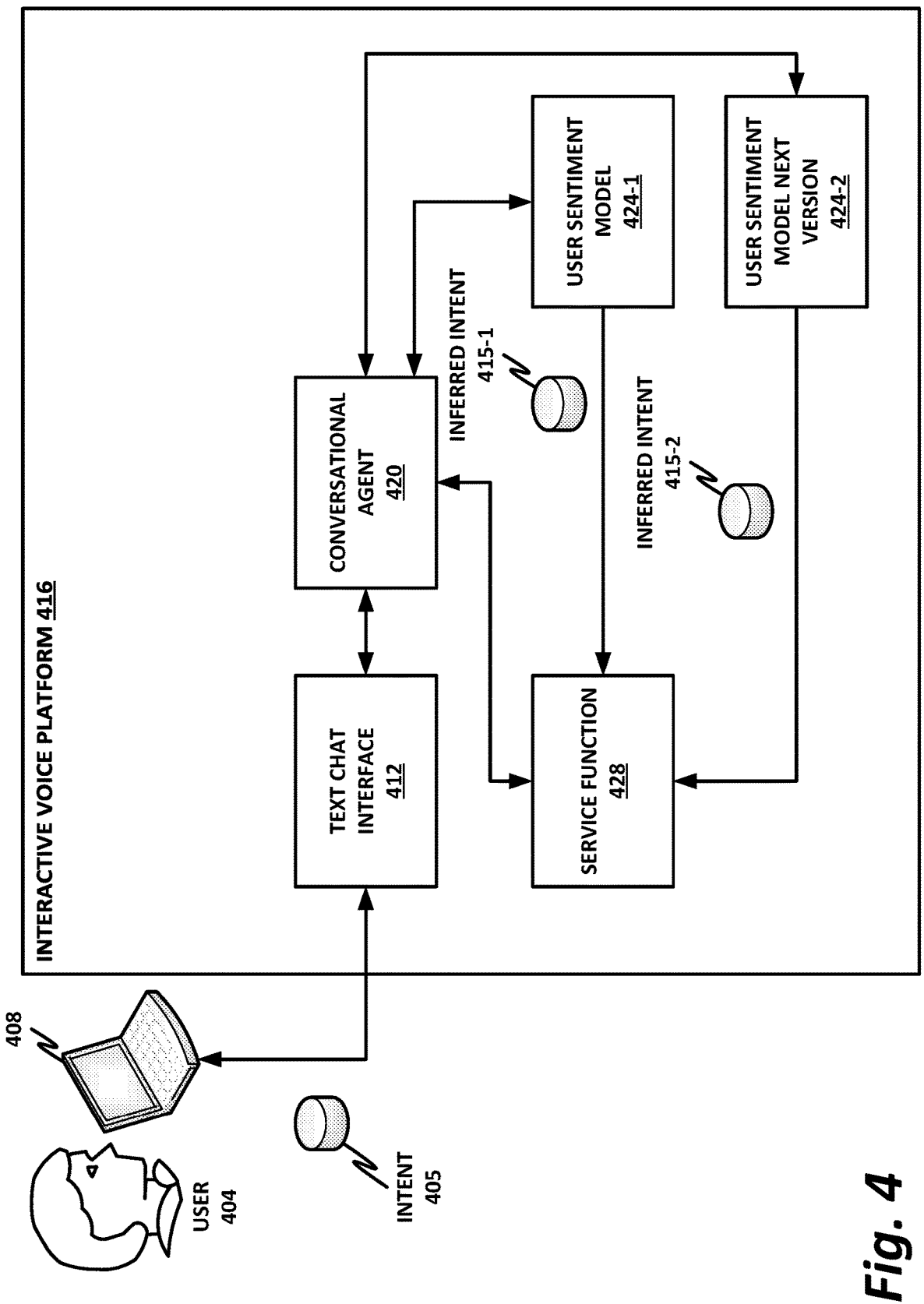
FIG. 4 is a block diagram of selected elements of a first embodiment of an IVP.

FIG. 4 is a block diagram of selected elements of an interactive voice platform (IVP) 416.

In this illustration, a user 404 operates a textual interface, such as via a laptop or desktop computer 408 to communicate with IVP 416. User 404 has a subjective intent 405. Intent 405 represents a high-level goal that user 404 is trying to achieve, and ideally subjective intent 405 corresponds to an available service function that IVP 416 can connect user 404 to, whether it be an automated service function or a service function provided by a human CSA. For example, user 404 may be trying to order a product, cancel service, report a problem, file a complaint, provide a review, book a flight, request repairs, or any other intent that may be serviced by IVP 416.

A text chat interface 412 provides an API for IVP 416 to interact with user 404 via text interface 408. In this case, because interactions already occur via text, there may be no need to provide speech-to-text or text-to-speech services.

Conversational agent 420 may include a trained ML model to determine how to respond to the customers queries. This may include a user sentiment model 424-1, which provides an inferred intent 415-1 to conversational agent 420. The mechanics of such ML models are well understood, and FIGS. 11 and 12 below illustrate some of the mechanics and principles of machine learning that may be applicable to the ML model.

Based on inferred intent 415-1, conversational agent 420 may place user 404 in contact with a service function 428, which will satisfy user 404's intent 405 if conversational agent 420 properly infers the user's intent.

As described above, a human speech expert or other may use a GAI or other methods to generate a large number of samples or predicted training prompts that can then be used to train user sentiment model next version 424-2. Next version 424-2 provides an inferred intent 415-2, which may be the same as inferred intent 415-1 or different. Comparison of the two models may be as illustrated in FIG. 3 above.

Figure 5:
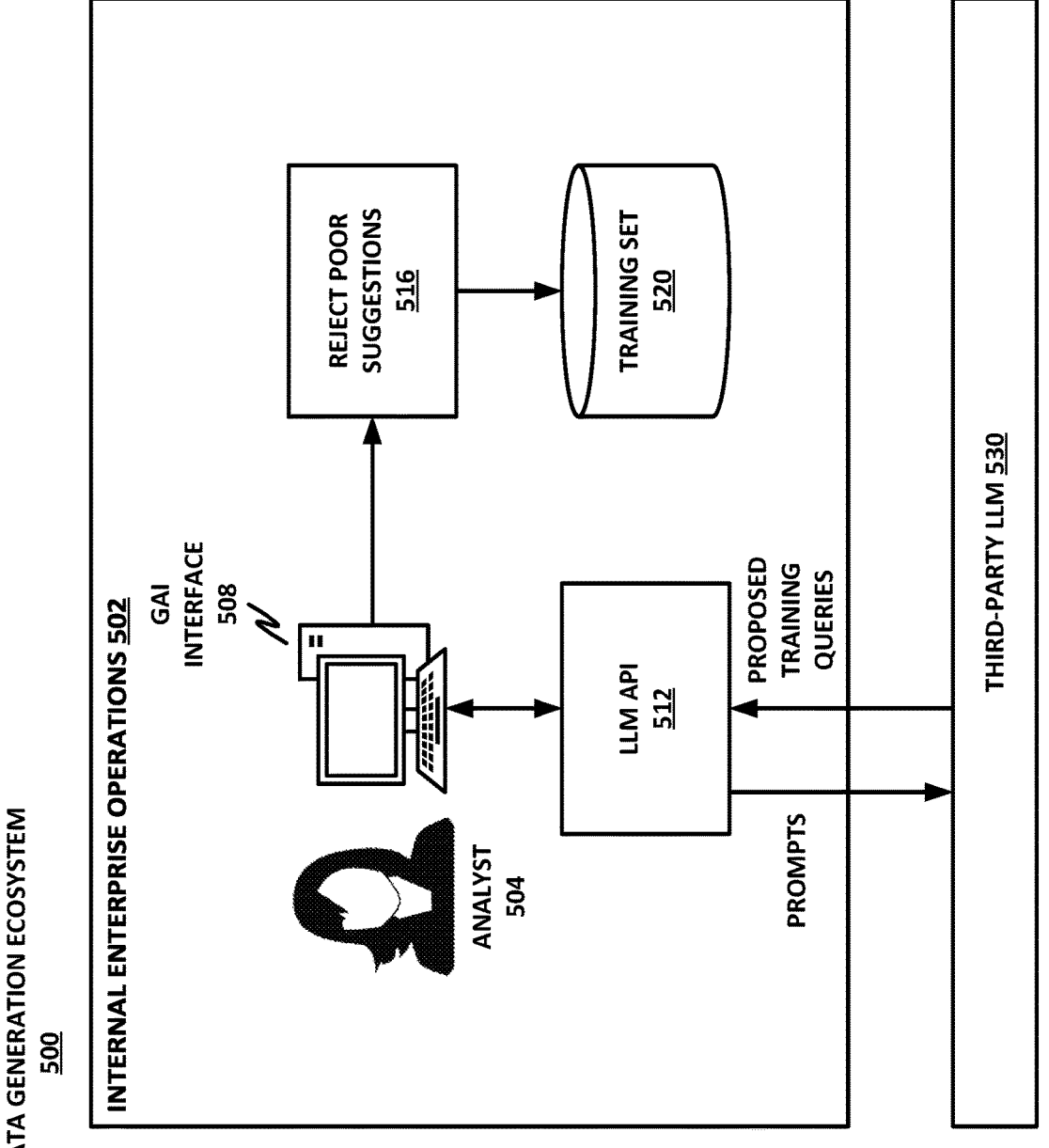
FIG. 5 is a block diagram of selected elements of a training data generation ecosystem.

FIG. 5 is a block diagram of selected elements of a training data generation ecosystem 500. Within training data generation ecosystem 500, there is an internal enterprise operation 502, which may represent operations of a testing service provider 160 (FIG. 1) or similar.

Human analyst 504 supplies a conversational LLM, represented here as third-party LLM 530, with a prompt that includes a high-level intent (e.g., "is flight on time"), a persona (e.g., "nervous," "calm," "excited," anxious," "talk-ative," or other), and other contextual information. Analyst 504 may also provide to LLM 530 some number of illustrative user-entered prompts, copied from recordings of real interactions with the IVP. To provide these inputs, analyst 504 operates a GAI interface 508, which may be for example a text input engine on a computing apparatus, or a speech input with speech-to-text capabilities. The computing apparatus provides an LLM API 512 which relays prompts from analyst 504 to third-party LLM 530. Third-party LLM 530 then returns proposed training queries to LLM API 512, and those training queries are provided to analyst 504.

Analyst 504 reviews the list of suggested test queries and in block 516 may reject poor suggestions. This may include, for example, those that are not plausible for a human speaker, those that are garbled, those that may mislead or mistrain the ML model, or others that are not useful. The process of providing prompts, receiving test scores, and rejecting poor suggestions may be repeated for other intents as necessary.

After receiving a good set of new training prompts, analyst 504 stores the prompts in training set 520. Training set 520 includes a new set of training prompts that can be used to train an ML model.

Figure 6:
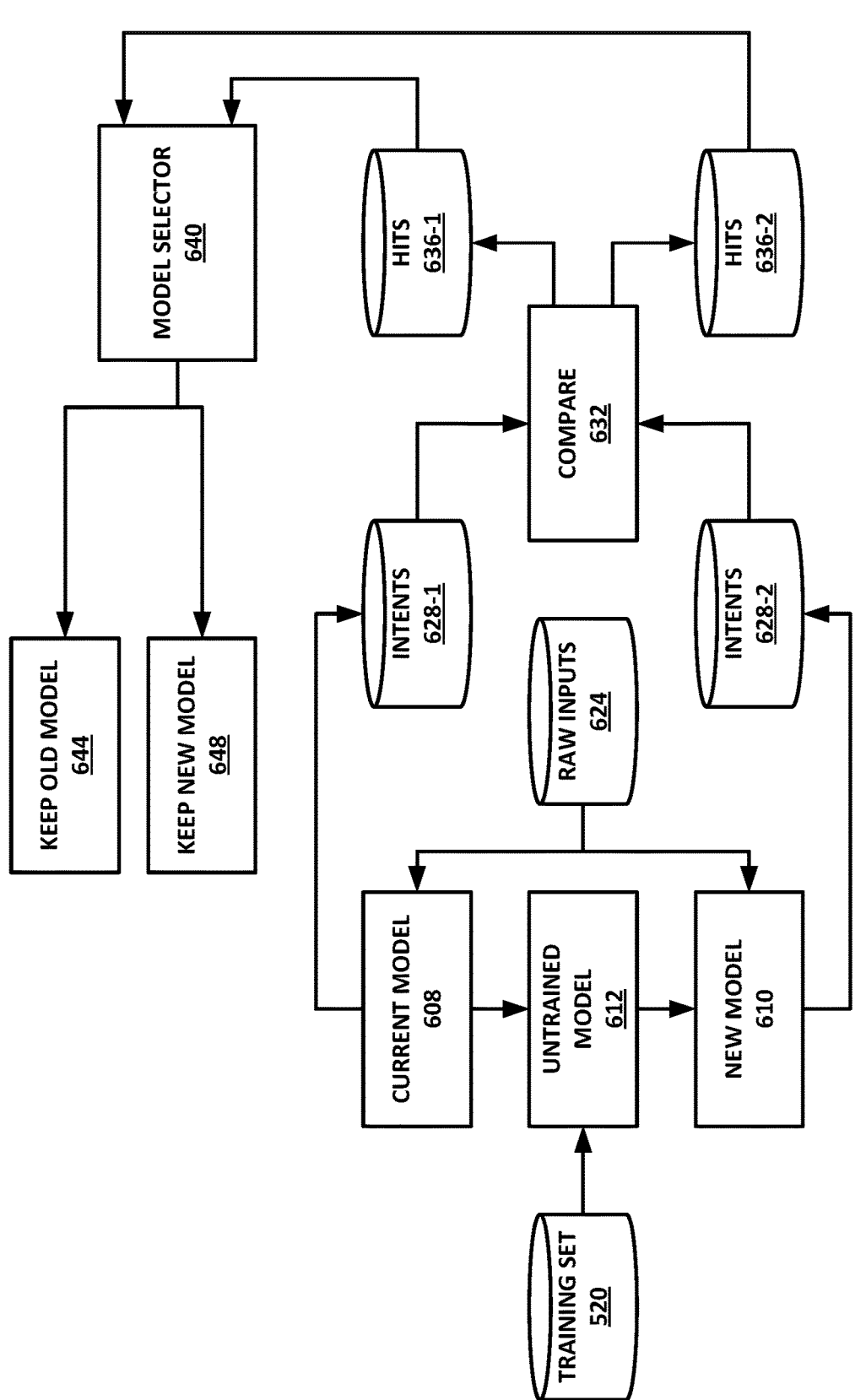
FIG. 6 is a block diagram of selected elements of a model comparison.

FIG. 6 is a block diagram of selected elements of training an ML model.

Training set 520 is provided to an updated model 612, which consumes the new training data from training set 520. This results in new model 610, which here competes with current model 608. Both the new model 610 and current model 608 receive a set of raw inputs 624, which may include recorded inputs from real-world past interactions that lack human assigned intents. This makes raw inputs 624 easy to obtain from logs of interactions with the model, and also ensures that neither model receives extra information from a human operator.

Processing raw inputs 624, both current model 608 and new model 610 generate a set of intents. Current model 608 generates intents 628-1, while new model 610 generates intents 628-2.

This may result in a large set of intents, such as hundreds or thousands of inferred intents based on the interactions from raw inputs 624. Within comparison block 632, instances where a raw inputs 624 yields an identical intent at 628-1 and 628-2, the results may be discarded from the comparison set because they are uninteresting for comparison purposes. Thus, within comparison block 632, the human operator may consider only instances where current model 608 and new model 610 inferred a different intent 628-1, 628-2 from a raw inputs 624. Advantageously, the set of prompts for which the inferred intents are different may be much smaller (e.g., on the order of 10 to 20%) of the full set of inferred intents. Furthermore, if current model 608 is already trusted to a certain degree, and the set of mismatched intents is very large, that itself may be grounds for rejecting new model 610.

Assuming a manageable set of different intents, within block 632 the human operator analyzes the transcripts to determine what the correct intent is. If one of the models inferred the correct intent and the other model inferred an incorrect intent, then the model that inferred a correct intent is credited with a hit. Hits for current model 608 are stored in 636-1, while hits for new model 610 are stored in 636-2.

The set of hits for each model are provided to model selector 640, which may be a human interaction or a machine interaction. In a straightforward example, the model that yielded more hits is considered the superior model. In other examples, more sophisticated algorithms may be used for model selection.

Based on an output from model selector 640, one of two results may occur. In block 644, the system may keep current model 608 (e.g., if the set of hits 636-1 is greater). Alternatively, if the set of hits 636-2 is greater, then in block 648, new model 610 may be kept as the current model.

When the processes iterated again, whichever model was selected will be used as current model 608. For example, if new model 610 scored more hits, it may become current model 608 on the next training iteration.

In cases where new model 610 has more hits, before selecting that model, it may be desirable to validate the model against a reference test set of user inputs that have human-annotated intents to ensure that performance of the reference test set has not degraded. Thus, even if new model 610 yields more hits 636-2 on the set of raw inputs 624, if new model 610 fails validation against the human-annotated reference set, new model 610 may be rejected.

Advantageously, the sets of hits 636-1, 636-2 can also be fed back to the reference model set as now-annotated interactions that can be used to validate future models. These can be used to train ML models with or without new suggestions from a conversational LLM.

Figure 7:
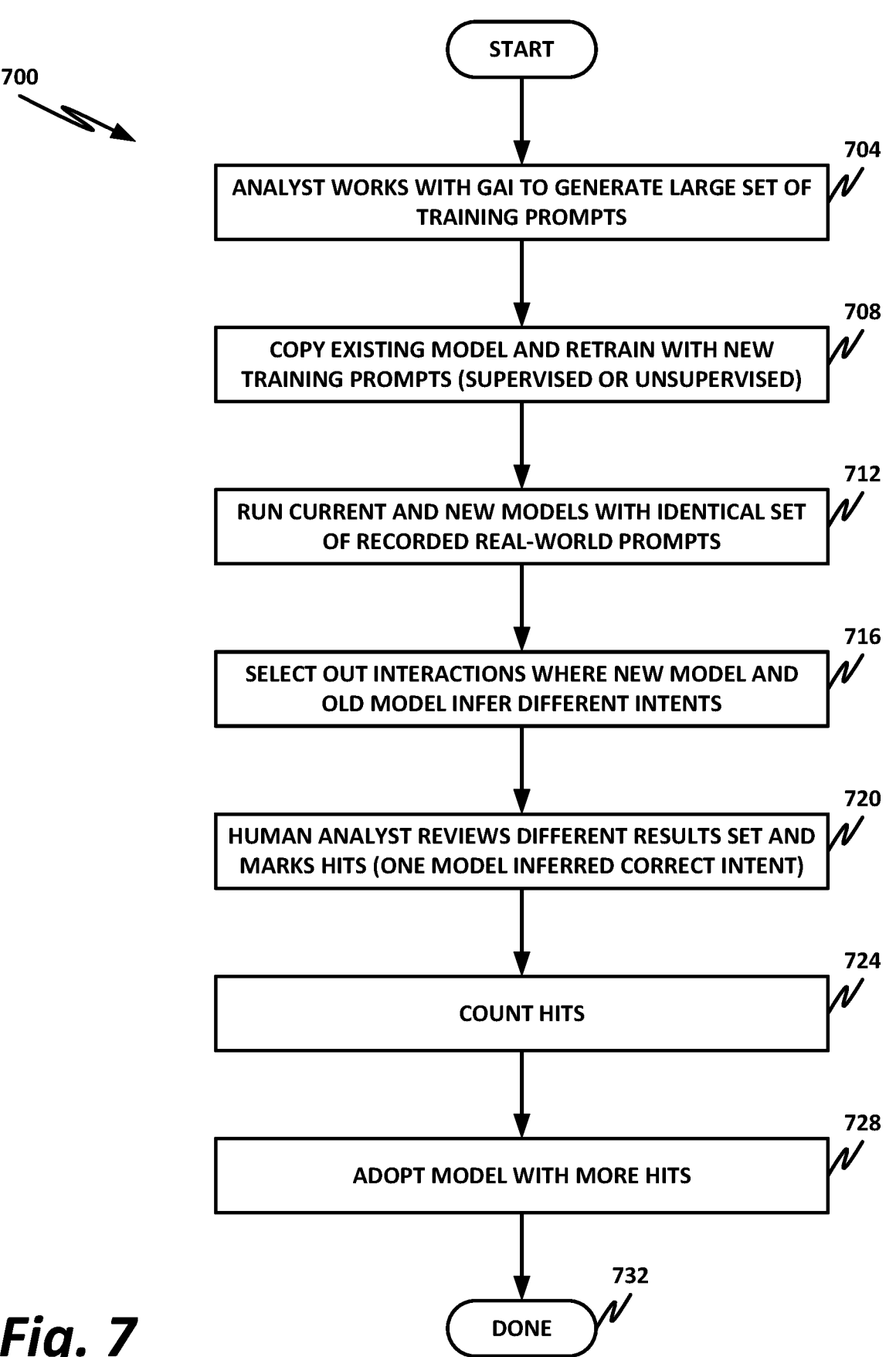
FIG. 7 is a flow chart of selected elements of a method of training and improving an ML model.

FIG. 7 is a flowchart of a method 700 of training and validating an ML model.

In block 704, a human analyst works with a GAI to generate a large set of training prompts for the ML model.

In block 708, the analyst or another agent may make a copy of the existing model and retrain it with the new training prompts. This training may be supervised or unsupervised, depending on the context of the embodiment. The purpose of the training may include to generate a new version of the model that should have superior performance to the old version of the model.

In block 712, the human analyst may run both the current and new models with an identical set of recorded real-world prompts. Alternatively, the new version of the model may run in the background alongside a deployed version of the current model, and may log its inferred intents, while not necessarily directly influencing the customer service function provided to the consumer.

In block 716, the system may select out interactions where the new model and the old model inferred different intents from the same human prompt.

In block 720, the human analyst may review the set of different results provided in block 716, and may mark hits comprising instances where one model inferred a correct intent and the other model inferred an incorrect intent.

In block 724, the system may count the hits for each model, to determine which model accrued more hits through the training interaction.

In block 728, an algorithm may be used to select a model to act as the current model. This may include simply selecting the model with more hits, while optionally validating the model against a set of reference prompts, particularly in the case where the new model is to be adopted. Assuming the selected model passes the validation test, then it may be selected as the current model for future use. Other more sophisticated algorithms may also be used.

In block 732, the method is done.

Figure 8:
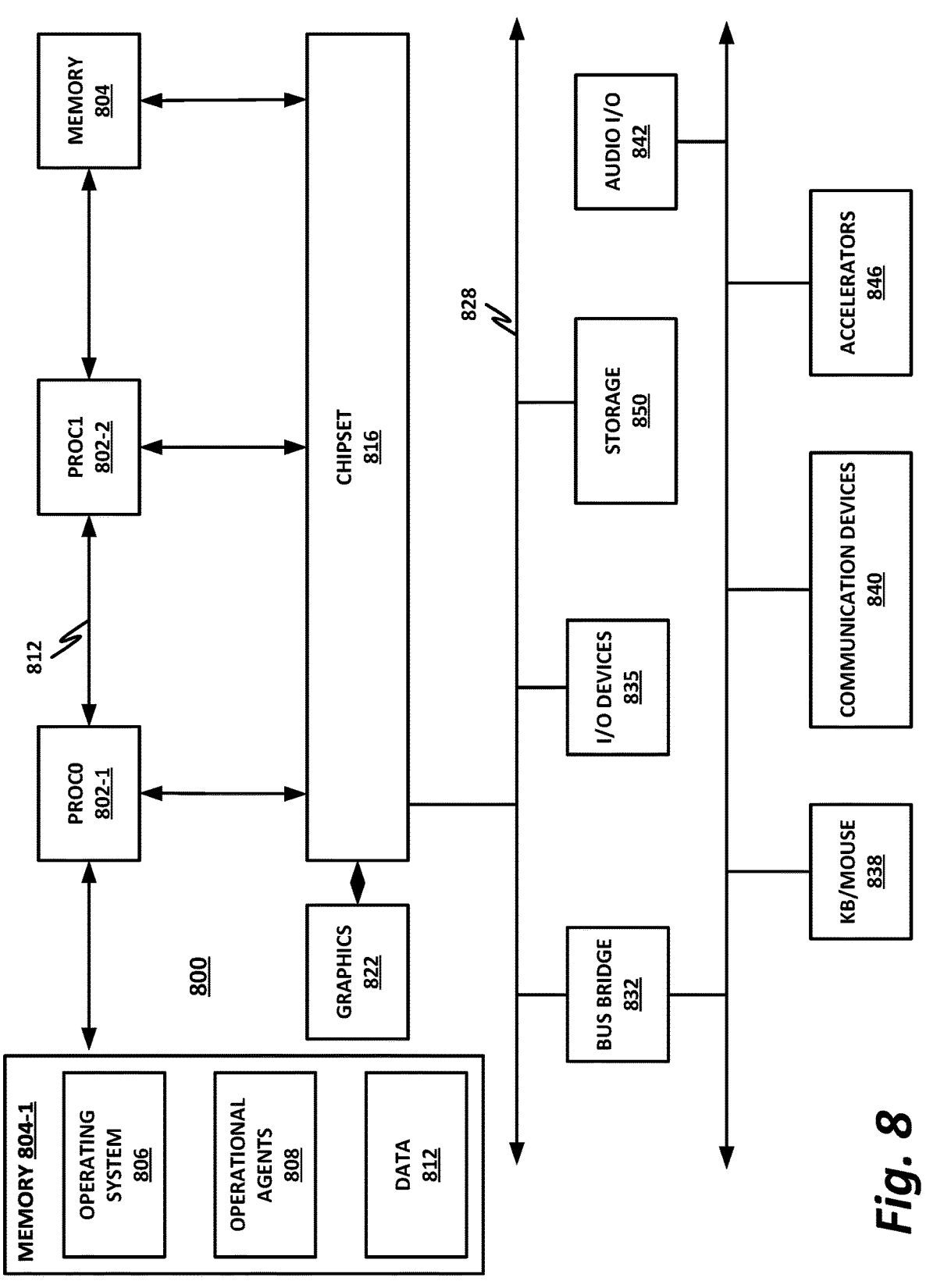
FIG. 8 is a block diagram of selected elements of a hardware platform.

FIG. 8 is a block diagram of a hardware platform 800. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more central processor units (CPU).

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency nonvolatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 822 may include a hardware graphics card, which may have its own memory and its own graphics processing unit (GPU).

Chipset 816 may be in communication with a bus 828 via an interface circuit. Bus 828 may have one or more devices that communicate over it, such as a bus bridge 832, I/O devices 835, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O 842, a data storage device 844, and/or accelerators 846. In alternative embodiments, any portions of the bus architectures could be implemented with one or more PtP links.

Operating system 806 may be, for example, Microsoft Windows, Linux, UNIX, Mac OS X, IOS, MS-DOS, or an embedded or real-time operating system (including embedded or real-time flavors of the foregoing). In some embodiments, a hardware platform 800 may function as a host platform for one or more guest systems that invoke application (e.g., operational agents 808).

Operational agents 808 may include one or more computing engines that may include one or more nontransitory computer-readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QuickPath Interconnect, QPI, or KTI), FibreChannel, Ethernet, FibreChannel over Ethernet (FCOE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIGURE QC. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 9:
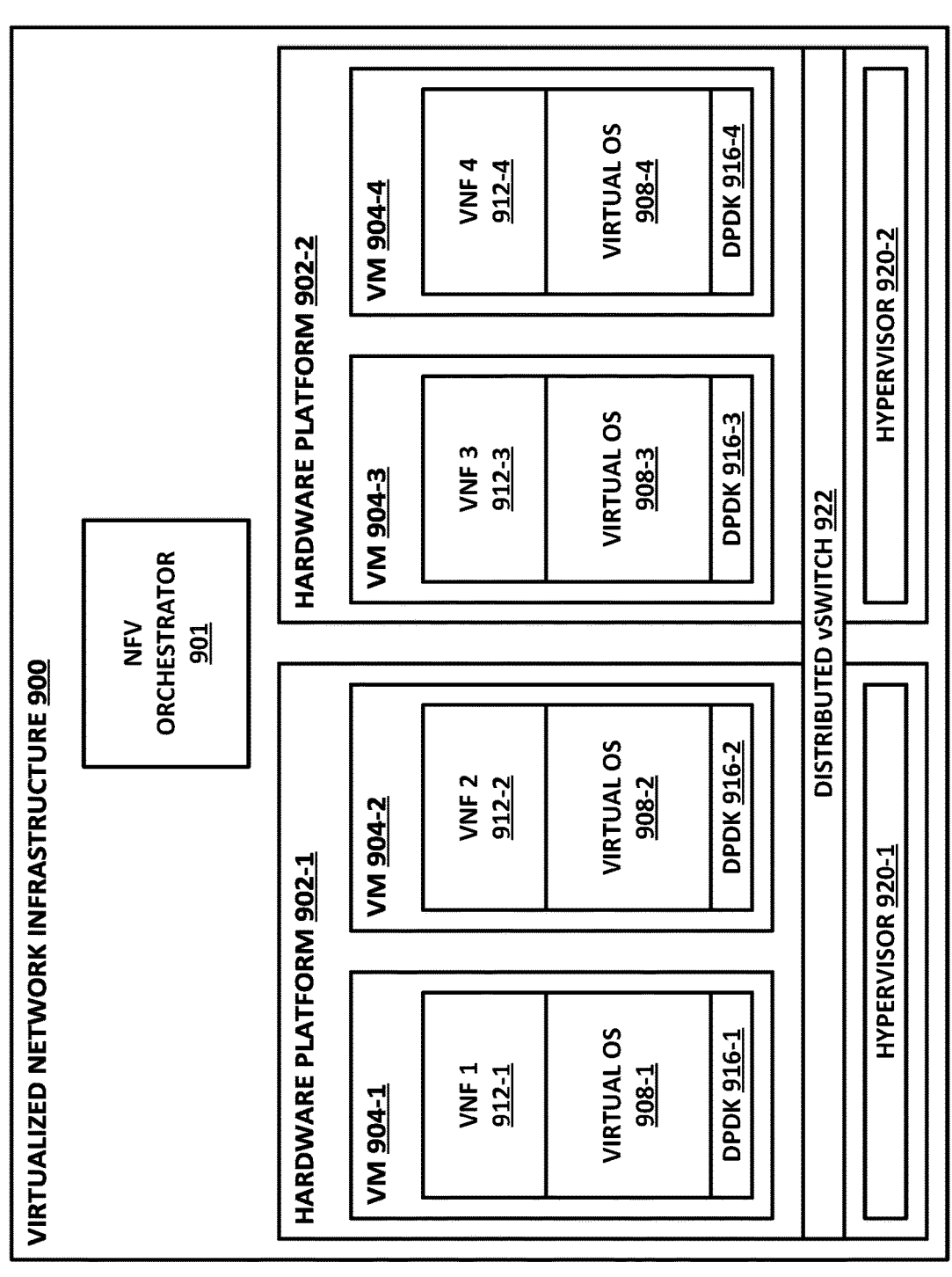
FIG. 9 is a block diagram of selected elements of a network function virtualization (NFV) infrastructure.

FIG. 9 is a block diagram of a NFV infrastructure 900. NFV is an example of virtualization, and the virtualization infrastructure here can also be used to realize traditional VMs. Various functions described above may be realized as VMs. For example, any of the interfaces or APIs illustrated above may be virtualized, as well as the ML models, LLMs, comparison functions, and others.

NFV is generally considered distinct from software defined networking (SDN), but they can interoperate together, and the teachings of this specification should also be understood to apply to SDN in appropriate circumstances. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be VMs). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 900. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 9, an NFV orchestrator 901 may manage several VNFs 912 running on an NFVI 900. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 901 a valuable system resource. Note that NFV orchestrator 901 may provide a browser-based or graphical configuration interface, and in some embodiments may be integrated with SDN orchestration functions.

Note that NFV orchestrator 901 itself may be virtualized (rather than a special-purpose hardware appliance). NFV orchestrator 901 may be integrated within an existing SDN system, wherein an operations support system (OSS) manages the SDN. This may interact with cloud resource management systems (e.g., OpenStack) to provide NFV orchestration. An NFVI 900 may include the hardware, software, and other infrastructure to enable VNFs to run. This may include a hardware platform 902 on which one or more VMs 904 may run. For example, hardware platform 902-1 in this example runs VMs 904-1 and 904-2. Hardware platform 902-2 runs VMs 904-3 and 904-4. Each hardware platform 902 may include a respective hypervisor 920, virtual machine manager (VMM), or similar function, which may include and run on a native (bare metal) operating system, which may be minimal so as to consume very few resources. For example, hardware platform 902-1 has hypervisor 920-1, and hardware platform 902-2 has hypervisor 920-2.

Hardware platforms 902 may be or comprise a rack or several racks of blade or slot servers (including, e.g., processors, memory, and storage), one or more data centers, other hardware resources distributed across one or more geographic locations, hardware switches, or network interfaces. An NFVI 900 may also include the software architecture that enables hypervisors to run and be managed by NFV orchestrator 901.

Running on NFVI 900 are VMs 904, each of which in this example is a VNF providing a virtual service appliance. Each VM 904 in this example includes an instance of the Data Plane Development Kit (DPDK) 916, a virtual operating system 908, and an application providing the VNF 912. For example, VM 904-1 has virtual OS 908-1, DPDK 916-1, and VNF 912-1. VM 904-2 has virtual OS 908-2, DPDK 916-2, and VNF 912-2. VM 904-3 has virtual OS 908-3, DPDK 916-3, and VNF 912-3. VM 904-4 has virtual OS 908-4, DPDK 916-4, and VNF 912-4.

Virtualized network functions could include, as nonlimiting and illustrative examples, firewalls, intrusion detection systems, load balancers, routers, session border controllers, DPI services, network address translation (NAT) modules, or call security association.

The illustration of FIG. 9 shows that a number of VNFs 904 have been provisioned and exist within NFVI 900. This FIGURE does not necessarily illustrate any relationship between the VNFs and the larger network, or the packet flows that NFVI 900 may employ.

The illustrated DPDK instances 916 provide a set of highly-optimized libraries for communicating across a virtual switch (vSwitch) 922. Like VMs 904, vSwitch 922 is provisioned and allocated by a hypervisor 920. The hypervisor uses a network interface to connect the hardware platform to the data center fabric (e.g., a host fabric interface (HFI)). This HFI may be shared by all VMs 904 running on a hardware platform 902. Thus, a vSwitch may be allocated to switch traffic between VMs 904. The vSwitch may be a pure software vSwitch (e.g., a shared memory vSwitch), which may be optimized so that data are not moved between memory locations, but rather, the data may stay in one place, and pointers may be passed between VMs 904 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 922 is illustrated, wherein vSwitch 922 is shared between two or more physical hardware platforms 902.

Figure 10:
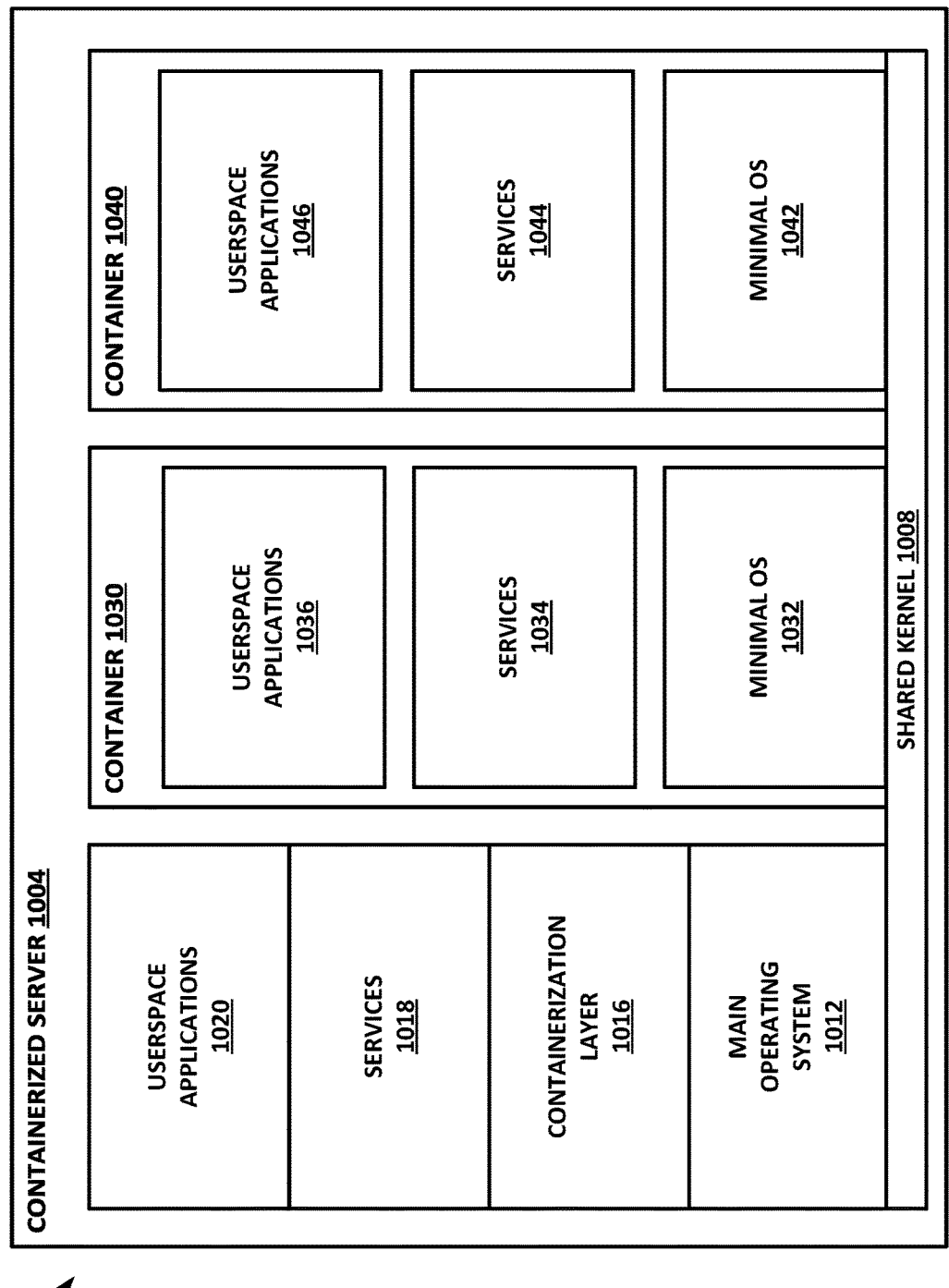
FIG. 10 is a block diagram of selected elements of a containerization infrastructure.

FIG. 10 is a block diagram of selected elements of a containerization infrastructure 1000. Like virtualization, containerization is a popular form of providing a guest infrastructure. Various functions described herein may be containerized. For example, any of the interfaces or APIs illustrated above may be containerized, as well as the ML models, LLMs, comparison functions, and others.

Containerization infrastructure 1000 runs on a hardware platform such as containerized server 1004. Containerized server 1004 may provide processors, memory, one or more network interfaces, accelerators, and/or other hardware resources.

Running on containerized server 1004 is a shared kernel 1008. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1008 is main operating system 1012. Commonly, main operating system 1012 is a Unix or Linux-based operating system, although containerization infrastructure is also available for other types of systems, including Microsoft Windows systems and Macintosh systems. Running on top of main operating system 1012 is a containerization layer 1016. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer (e.g., Docker) versus one without a daemon (e.g., Podman). Such debates are outside the scope of the present specification, and when the present specification speaks of containerization, it is intended to include any containerization layer, whether it requires the use of a daemon or not.

Main operating system 1012 may also provide services 1018, which provide services and interprocess communication to userspace applications 1020.

Services 1018 and userspace applications 1020 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1012, they inherit the same file and resource access permissions as those provided by shared kernel 1008. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1004, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1004).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors-especially type 1, or "bare metal," hypervisors-provide such near-native performance that this advantage may not always be realized.

In this example, containerized server 1004 hosts two containers, namely container 1030 and container 1040.

Container 1030 may include a minimal operating system 1032 that runs on top of shared kernel 1008. Note that a minimal operating system is provided as an illustrative example, and is not mandatory. In fact, container 1030 may perform as full an operating system as is necessary or desirable. Minimal operating system 1032 is used here as an example simply to illustrate that in common practice, the minimal operating system necessary to support the function of the container (which in common practice, is a single or monolithic function) is provided.

On top of minimal operating system 1032, container 1030 may provide one or more services 1034. Finally, on top of services 1034, container 1030 may also provide userspace applications 1036, as necessary.

Container 1040 may include a minimal operating system 1042 that runs on top of shared kernel 1008. Note that a minimal operating system is provided as an illustrative example, and is not mandatory. In fact, container 1040 may perform as full an operating system as is necessary or desirable. Minimal operating system 1042 is used here as an example simply to illustrate that in common practice, the minimal operating system necessary to support the function of the container (which in common practice, is a single or monolithic function) is provided.

On top of minimal operating system 1042, container 1040 may provide one or more services 1044. Finally, on top of services 1044, container 1040 may also provide userspace applications 1046, as necessary.

Using containerization layer 1016, containerized server 1004 may run discrete containers, each one providing the minimal operating system and/or services necessary to provide a particular function. For example, containerized server 1004 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

Figure 11:
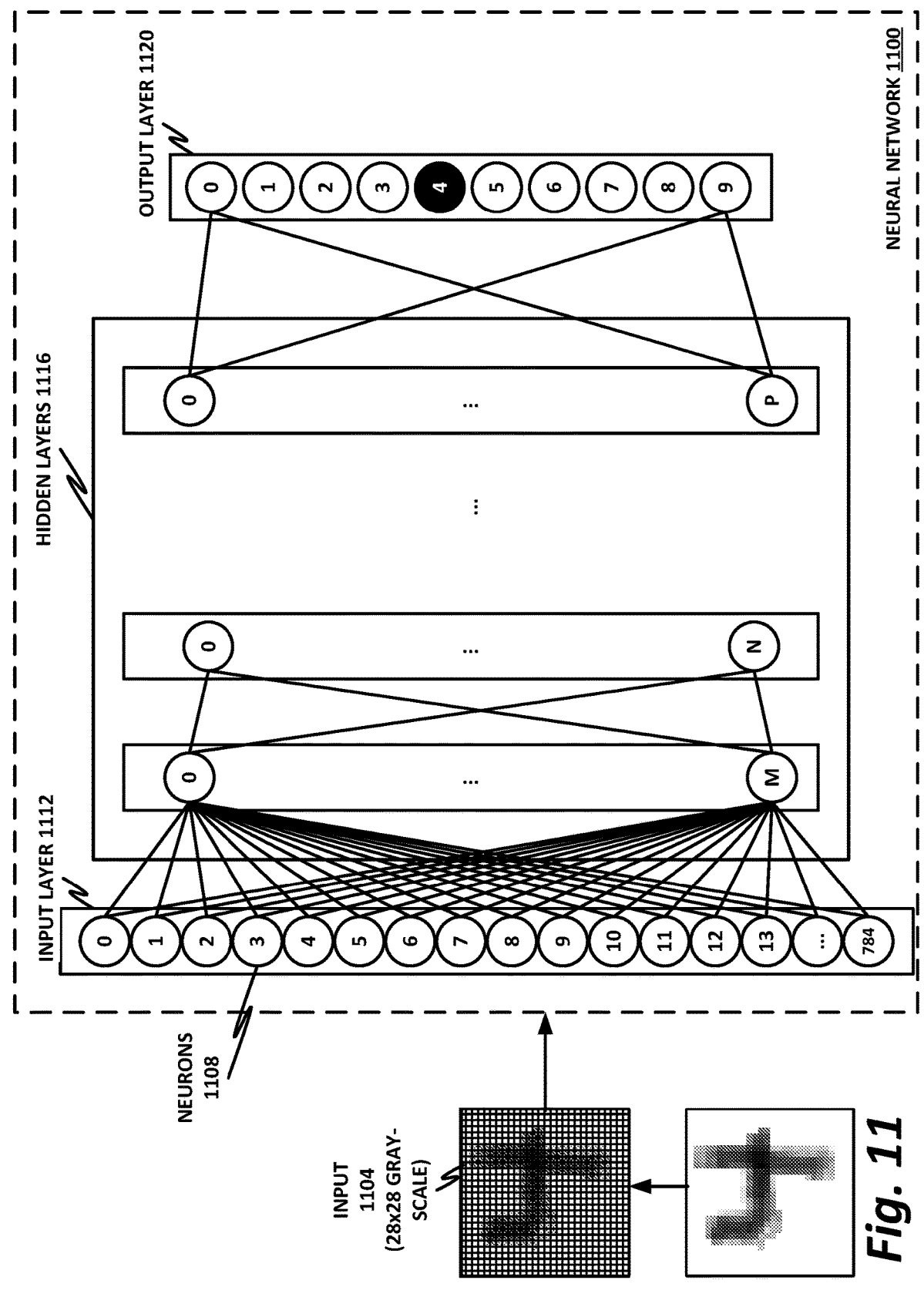
FIG. 11 illustrates machine learning according to a "textbook" problem with real-world applications.
Figure 12:
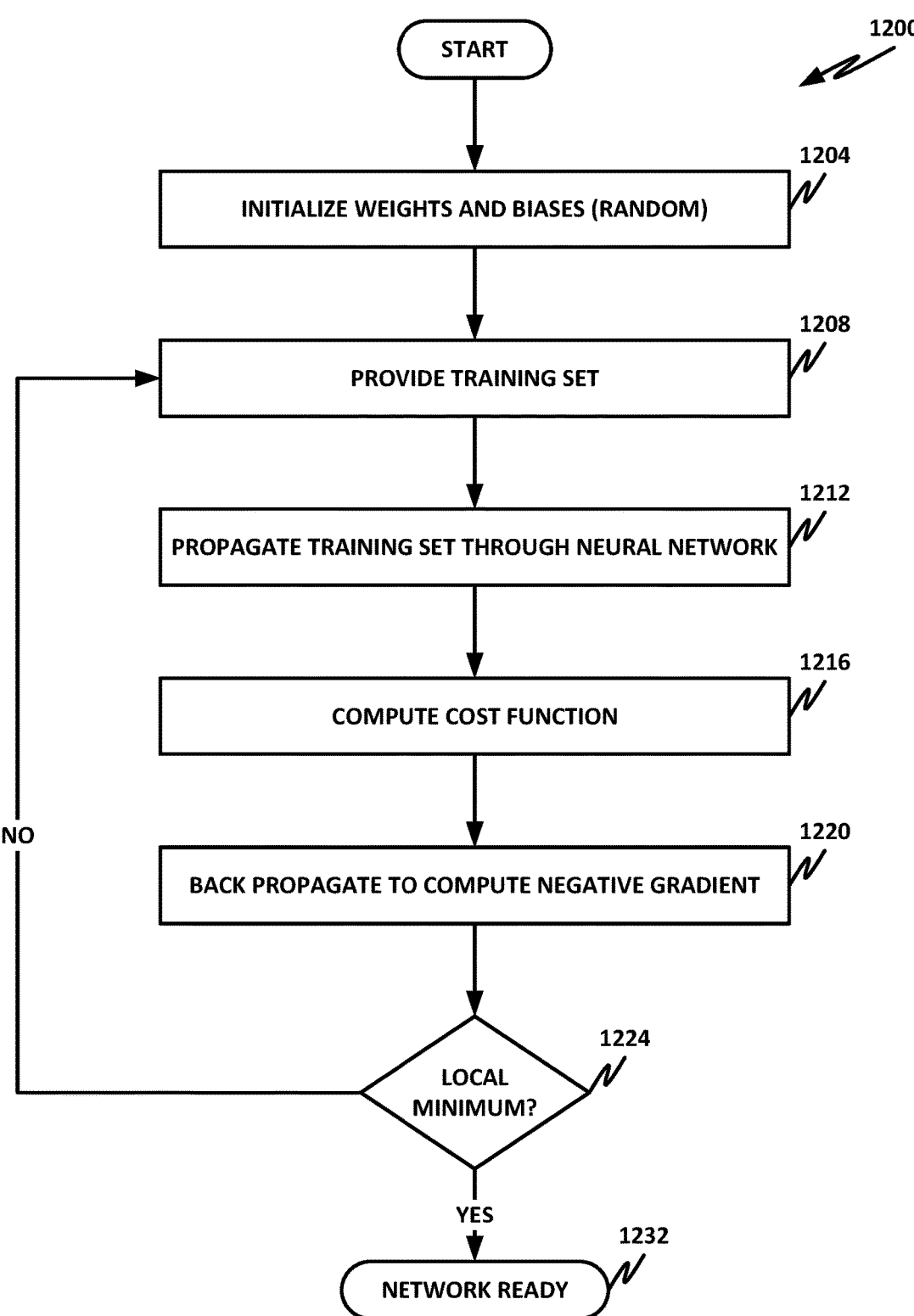
FIG. 12 is a flowchart of a method that may be used to train a neural network.

FIGS. 11 and 12 illustrate selected elements of an artificial intelligence system or architecture. In these FIGURES, an elementary neural network is used as a representative embodiment of an artificial intelligence (AI) or machine learning (ML) architecture or engine. These figures represent a nonlimiting example AI. The purpose of these figures is not necessarily to exhaustively reproduce the AI elements of the present specification. The AI principles disclosed in this specification are well-understood in the art, and user sentiment models disclosed herein are not intended to claim AI itself as a novel technology. Rather, the IVP system and method illustrate a novel application of known AI principles. Thus, the figures provided here are intended to review some foundational concepts of AI (particularly "deep learning" in the context of a deep neural network) and provide a meaningful vocabulary for discussion of AI terms used throughout this specification.

The deep learning network illustrated here should thus be understood to represent AI principles in general. Other machine learning or artificial intelligence architectures are available, including for example symbolic learning, robotics, computer vision, pattern recognition, statistical learning, speech recognition, natural language processing, deep learning, convolutional neural networks, recurrent neural networks, object recognition and/or others.

FIG. 11 illustrates machine learning according to a "textbook" problem with real-world applications. In this case, a neural network 1100 is tasked with recognizing characters. To simplify the description, neural network 1100 is tasked only with recognizing single digits in the range of 0 through 9. These are provided as an input image 1104. In this example, input image 1104 is a 28×28-pixel 8-bit grayscale image. In other words, input image 1104 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. Only selected elements of neural network 1100 are illustrated in this FIGURE, and that real-world applications may be more complex, and may include additional features, such as the use of multiple channels (e.g., for a color image, there may be three distinct channels for red, green, and blue). Additional layers of complexity or functions may be provided in a neural network, or other artificial intelligence architecture, to meet the demands of a particular problem. Indeed, the architecture here is sometimes referred to as the "Hello World" problem of machine learning, and is provided as but one example of how the machine learning or artificial intelligence functions of the present specification could be implemented.

In this case, neural network 1100 includes an input layer 1112 and an output layer 1120. In principle, input layer 1112 receives an input such as input image 1104, and at output layer 1120, neural network 1100 "lights up" a perceptron that indicates which character neural network 1100 thinks is represented by input image 1104.

Between input layer 1112 and output layer 1120 are some number of hidden layers 1116. The number of hidden layers 1116 will depend on the problem to be solved, the available compute resources, and other design factors. In general, the more hidden layers 1116, and the more neurons per hidden layer, the more accurate the neural network 1100 may become. However, adding hidden layers and neurons also increases the complexity of the neural network, and its demand on compute resources. Thus, some design skill is required to determine the appropriate number of hidden layers 1116, and how many neurons are to be represented in each hidden layer 1116.

Input layer 1112 includes, in this example, 784 "neurons" 1108. Each neuron of input layer 1112 receives information from a single pixel of input image 1104. Because input image 1104 is a 28×28 grayscale image, it has 784 pixels. Thus, each neuron in input layer 1112 holds 8 bits of information, taken from a pixel of input layer 1104. This 8-bit value is the "activation" value for that neuron.

Each neuron in input layer 1112 has a connection to each neuron in the first hidden layer in the network. In this example, the first hidden layer has neurons labeled 0 through M. Each of the M+1 neurons is connected to all 784 neurons in input layer 1112. Each neuron in hidden layer 1116 includes a kernel or transfer function, which is described in greater detail below. The kernel or transfer function determines how much "weight" to assign each connection from input layer 1112. In other words, a neuron in hidden layer 1116 may think that some pixels are more important to its function than other pixels. Based on this transfer function, each neuron computes an activation value for itself, which may be for example a decimal number between 0 and 1.

A common operation for the kernel is convolution, in which case the neural network may be referred to as a "convolutional neural network" (CNN). The case of a network with multiple hidden layers between the input layer and output layer may be referred to as a "deep neural network" (DNN). A DNN may be a CNN, and a CNN may be a DNN, but neither expressly implies the other.

Each neuron in this layer is also connected to each neuron in the next layer, which has neurons from 0 to N. As in the previous layer, each neuron has a transfer function that assigns a particular weight to each of its M+1 connections and computes its own activation value. In this manner, values are propagated along hidden layers 1116, until they reach the last layer, which has P+1 neurons labeled 0 through P. Each of these P+1 neurons has a connection to each neuron in output layer 1120. Output layer 1120 includes a number of neurons known as perceptrons that compute an activation value based on their weighted connections to each neuron in the last hidden layer 1116. The final activation value computed at output layer 1120 may be thought of as a "probability" that input image 1104 is the value represented by the perceptron. For example, if neural network 1100 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1116 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a nontrivial problem, and may require greater sophistication in programming and training than is fairly represented in this simplified example.

The activation value for neurons in the input layer is simply the value taken from the corresponding pixel in the bitmap. The activation value (a) for each neuron in succeeding layers is computed according to a transfer function, which accounts for the "strength" of each of its connections to each neuron in the previous layer. The transfer can be written as a sum of weighted inputs (i.e., the activation value (a) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular "rectified linear unit" (ReLU) function. In the examples of this specification, a sigmoid function notation (o) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)} = \sigma\left(w_0 a_0^{(0)} + w_1 a_1^{(0)} + \cdots \; w_{783} a_{783}^{(0)} + b\right)$$

In this case, it is assumed that layer 0 (input layer 1112) has 784 neurons. Where the previous layer has "n" neurons, the function can be generalized as:

$$a_0^{(1)} = \sigma\left(w_0 a_0^{(0)} + w_1 a_1^{(0)} + \cdots \; w_n a_n^{(0)} + b\right)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma\left(\begin{bmatrix} w_{0,0} & \cdots & w_{0,n} \\ \vdots & \ddots & \vdots \\ w_{(k,0)} & \cdots & w_{k,n} \end{bmatrix}\begin{bmatrix} a_0^{(0)} \\ \vdots \\ a_n^{(0)} \end{bmatrix} + \begin{bmatrix} b_0 \\ \vdots \\ b_n \end{bmatrix}\right)$$

More compactly, the full transfer function for layer 1 can be written in vector notation as:

$$a^{(1)} = \sigma\left(W a^{(0)} + b\right)$$

Neural connections and activation values are propagated throughout the hidden layers 1116 of the network in this way, until the network reaches output layer 1120. At output layer 1120, each neuron is a "bucket" or classification, with the activation value representing a probability that the input object should be classified to that perceptron. The classifications may be mutually exclusive or multinominal. For example, in the computer vision example of character recognition, a character may best be assigned only one value, or in other words, a single character is not expected to be simultaneously both a "4" and a "9." In that case, the neurons in output layer 1120 are binomial perceptrons. Ideally, only one value is above the threshold, causing the perceptron to metaphorically "light up," and that value is selected. In the case where multiple perceptrons light up, the one with the highest probability may be selected. The result is that only one value (in this case, "4") should be lit up, while the rest should be "dark." Indeed, if the neural network were theoretically perfect, the "4" neuron would have an activation value of 1.00, while each other neuron would have an activation value of 0.00.

In the case of multinominal perceptrons, more than one output may be lit up. For example, a neural network may determine that a particular document has high activation values for perceptrons corresponding to several departments, such as Accounting, Information Technology (IT), and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights-and-biases controls are garbage, the initial output is expected to be garbage. In the case of a "supervised" learning algorithm, the network is refined by providing a "training" set, which includes objects with known results. Because the correct answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network does not know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw}(w) = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutel minimum is many times harder, particularly when the function has thousands or millions of variables. Thus, common neural networks consider a local minimum to be "good enough," with adjustments possible if the local minimum yields unacceptable results. Because the cost function is ultimately an average error value over the entire training set, minimizing the cost function yields a (locally) lowest average error.

In many cases, the most difficult part of gradient descent is computing the value of $-\nabla C$. As mentioned above, computing this symbolically or exactly would be prohibitively difficult. A more practical method is to use back-propagation to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron metaphorically "wishes" that certain activations from the previous layer were larger or smaller. Those wishes can be back-propagated to the previous layer neurons.

At the next layer, the neuron accounts for the wishes from the next downstream layer in determining its own preferred activation value. Again, at this layer, the activation values are not hard-coded. Each neuron can adjust its own weights and biases, and then back-propagate changes to the activation values that it wishes would occur. The back-propagation continues, layer by layer, until the weights and biases of the first hidden layer are set. This layer cannot back-propagate desired changes to the input layer, because the input layer receives activation values directly from the input image.

After a round of such nudging, the network may receive another round of training with the same or a different training data set, and the process is repeated until a local and/or global minimum value is found for the cost function.

FIG. 12 is a flowchart of a method 1200. Method 1200 may be used to train a neural network, such as neural network 1100 of FIG. 11.

In block 1204, the network is initialized. Initially, neural network 1100 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 1208, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 1208, the initial training set is provided to the neural network. Alternatively, the full training set could be used in each iteration.

In block 1212, the training data are propagated through the neural network. Because the initial values are random, and are therefore essentially garbage, it is expected that the output will also be a garbage value. In other words, if neural network 1100 of FIG. 11 has not been trained, when input image 1104 is fed into the neural network, it is not expected with the first training set that output layer 1120 will light up perceptron 4. Rather, the perceptrons may have values that are all over the map, with no clear winner, and with very little relation to the number 4.

In block 1216, a cost function is computed as described above. For example, in neural network 1100, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 1220, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 1224, the system determines whether it has reached a local minimum (e.g., whether the gradient has reached 0 within the threshold). If the local minimum has not been reached, then the neural network has not been adequately trained, and control returns to block 1208 with a new training set. The training sequence continues until, in block 1224, a local minimum has been reached.

Now that a local minimum has been reached and the corrections have been back-propagated, in block 1232, the neural network is ready.

Although FIGS. 11 and 12 illustrate an AI application for recognizing characters, that function does not represent the limit of modern-day AI practice. AIs have been adapted to many tasks, and generative AIs (GAI) are also common now. For example, generative pre-trained transformer (GPT) networks are popular for their ability to naturally interact with human users, effectively imitating human speech patterns. GAI networks have also been trained for creating and modifying art, engineering designs, books, and other information.

Many of the foregoing GAIs are general-purpose GAIs, meaning that they are trained on very large data sets (e.g., on the order of many terabytes of data), and have general knowledge on many subjects. However, domain-specific AIs are also used in other contexts. General-purpose AIs are generally trained on very large data sets in an unsupervised or semi-unsupervised regimen, which provides the breadth that may benefit a general-purpose AI. Domain-specific AIs are often based on general-purpose AIs, and may start from a pre-trained model. The pre-trained model can then be refined and re-trained using supervised learning, such as with structured, curated, and tagged data sets. This supervised learning can morph the AI model into a model that has specialized utility in a specific knowledge domain.

The foregoing outlines features of several embodiments so that those skilled in the art may better understand various aspects of the present disclosure. The foregoing detailed description sets forth examples of apparatuses, methods, and systems relating to a machine learning model improvement, in accordance with one or more embodiments of the present disclosure. Features such as structure(s), function(s), and/or characteristic(s), for example, are described with reference to one embodiment as a matter of convenience; various embodiments may be implemented with any suitable one or more of the described features.

As used throughout this specification, the phrase "an embodiment" is intended to refer to one or more embodiments. Furthermore, different uses of the phrase "an embodiment" may refer to different embodiments. The phrases "in another embodiment" or "in a different embodiment" refer to an embodiment different from the one previously described, or the same embodiment with additional features. For example, "in an embodiment, features may be present. In another embodiment, additional features may be present." The foregoing example could first refer to an embodiment with features A, B, and C, while the second could refer to an embodiment with features A, B, C, and D, with features, A, B, and D, with features, D, E, and F, or any other variation.

In the foregoing description, various aspects of the illustrative implementations may be described using terms commonly employed by those skilled in the art to convey the substance of their work to others skilled in the art. It will be apparent to those skilled in the art that the embodiments disclosed herein may be practiced with only some of the described aspects. For purposes of explanation, specific numbers, materials, and configurations are set forth to provide a thorough understanding of the illustrative implementations. In some cases, the embodiments disclosed may be practiced without specific details. In other instances, well-known features are omitted or simplified so as not to obscure the illustrated embodiments.

For the purposes of the present disclosure and the appended claims, the article "a" refers to one or more of an item. The phrase "A or B" is intended to encompass the "inclusive or," e.g., A, B, or (A and B). "A and/or B" means A, B, or (A and B). For the purposes of the present disclosure, the phrase "A, B, and/or C" means A, B, C, (A and B), (A and C), (B and C), or (A, B, and C).

The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a volatile or nonvolatile memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random-access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is not intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected elements. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

To aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computer-implemented method, comprising:
providing a large set of validation prompts;
testing a first machine learning (ML) intent model with the large set of validation prompts, wherein the first ML intent model is to select for respective validation prompts a first intent from an intent set;
testing a second ML intent model with the large set of validation prompts, wherein the second ML intent model is to select for the same validation prompts a second intent from the intent set;
selecting a reduced set of validation prompts, comprising validation prompts for which the first intent and second intent do not match;
receiving an analysis of the reduced set of validation prompts, including indicia of hits, wherein one of the ML intent models inferred a correct intent;
selecting as a preferred model an ML model of the first ML intent model or second ML model that provided more hits; and
deploying the preferred model to process artificial intelligence (AI) workloads.

2. The method of claim 1, wherein the analysis of the reduced set of validation prompts is a human analysis.

3. The method of claim 1, wherein the second ML model is an updated version of the first ML intent model trained on a large set of training prompts.

4. The method of claim 3, wherein the second ML model receives supervised training on the large set of training prompts.

5. The method of claim 3, wherein the second ML model receives unsupervised training on the large set of training prompts.

6. The method of claim 3, further comprising generating the large set of training prompts with aid of a large language model (LLM).

7. The method of claim 6, further comprising a human analyst prompting the LLM to generate the large set of training prompts.

8. The method of claim 7, further comprising the human analyst rejecting undesirable training prompts.

9. The method of claim 3, further comprising the human analyst prompting the LLM to generate a set of varied identifiers for entities.

10. The method of claim 3, wherein the large set of training prompts comprise more than 50 training prompts per intent in the intent set.

11. The method of claim 1, wherein the intent set comprises more than 50 intents.

12. The method of claim 1, wherein the first ML intent model and second ML model are natural language processing (NLP) models.

13. The method of claim 1, wherein the first ML intent model and second ML model are to provide an interactive voice response (IVR) system.

14. The method of claim 1, wherein the first ML intent model and second ML model are to provide an interactive voice assistant (IVA).

15. The method of claim 1, wherein the first ML intent model and second ML model are to provide a customer service function.

16. One or more tangible, nontransitory computer-readable storage media having stored thereon executable instructions to:
provide a large set of validation prompts;
test a first machine learning (ML) intent model with the large set of validation prompts, wherein the first ML intent model is to select for respective validation prompts a first intent from an intent set;
test a second ML intent model with the large set of validation prompts, wherein the second ML intent model is to select for the same validation prompts a second intent from the intent set;
select a reduced set of validation prompts, comprising validation prompts for which the first intent and second intent do not match;
receive an analysis of the reduced set of validation prompts, including indicia of hits, wherein one of the ML intent models inferred a correct intent;
select as a preferred model an ML model of the first ML intent model or second ML model that provided more hits; and
deploy the preferred model to process artificial intelligence (AI) workloads.

17. The one or more tangible, nontransitory computer-readable storage media of claim 16, wherein the second ML model is an updated version of the first ML intent model trained on a large set of training prompts.

18. A computing apparatus, comprising:
a hardware platform comprising a processor circuit and a memory; and instructions encoded within the memory to instruct the processor circuit to:

provide a large set of validation prompts;

test a first machine learning (ML) model with the large set of validation prompts, wherein the first ML model is to select for respective validation prompts a first intent from an intent set;

test a second ML model with the large set of validation prompts, wherein the second ML model is to select for the same validation prompts a second intent from the intent set;

select a reduced set of validation prompts, comprising validation prompts for which the first intent and second intent do not match;

receive an analysis of the reduced set of validation prompts, including indicia of hits, wherein one of the ML models inferred a correct intent;

select as a preferred model an ML model of the first ML model or second ML model that provided more hits; and deploy the preferred model to process artificial intelligence (AI) workloads.

19. The computing apparatus of claim 18, wherein the second ML model is an updated version of the first ML model trained on a large set of training prompts.

* * * * *